Figures 1, 2:
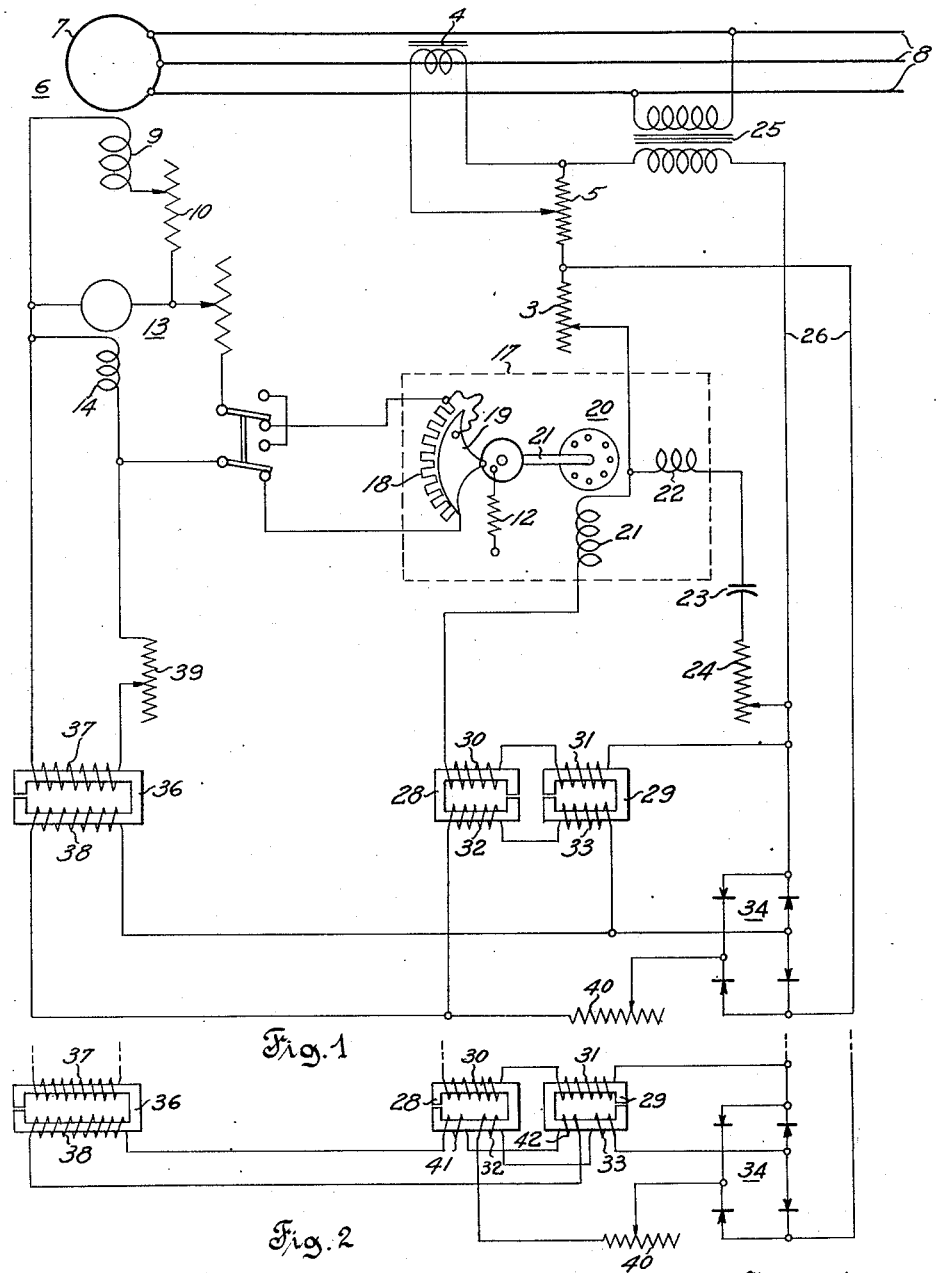

Inventors
Daniel J. Sikorra
Dale V. Hotson
by T. Lloyd La Fave
Attorney

Patented Apr. 17, 1951

2,549,250

UNITED STATES PATENT OFFICE 2,549,250

VOLTAGE REGULATOR WITH PHASE SPLITTING CIRCUIT CONTROLLED BY INDUCTIVE DAMPING MEANS

Daniel J. Sikorra and Dale V. Hotson, Milwaukee, Wis., assignors to Allis-Chalmers Manufacturing Company, Milwaukee, Wis., a corporation of Delaware Application March 5, 1949, Serial No. 79,832

4 Claims. (Cl. 322—19)

This invention relates in general to regulating systems, and particularly to a system in which an electrical quantity is controlled by means of an electrically actuated regulator.

Regulator systems having a time lag between a change in a controlling influence and the resulting change in a regulated quantity due to a controlling action have an inherent tendency to overshoot or hunt so that the regulated quantity is subject to fluctuations. In accordance with a feature of this invention improved static electrical means are provided for opposing the action of the regulator to prevent objectionable oscillations in the regulated quantity, particularly in alternating current regulators.

It is therefore an object of the present invention to provide an improved electrical regulating system responsive to the controlling action of the regulator for altering the controlling action thereof.

Another object of the present invention is to provide an electrical regulating system in which the action of static electrical damping means is rendered applicable to regulators operating with alternating current.

Another object of the invention is to provide an improved electrical regulating system including a split-phase motor in which the motor circuit is arranged to enable the motor to develop a maximum rated torque.

Objects and advantages other than those stated above will be apparent from the following description when read in connection with the accompanying drawing in which:

Fig. 1 diagrammatically illustrates one embodiment of the invention; and

Fig. 2 illustrates a modification of the damping system illustrated in Fig. 1.

Referring to the drawing, the invention is shown embodied in a regulating system for maintaining the output voltage of an alternating current dynamoelectric machine, such as a generator 6, at a desired value. Generator 6 has an armature 7 connected to supply a three phase alternating current circuit 8. The generator also includes a field winding 9 connected through a field rheostat 10 to a suitable source of direct current for energizing the field winding.

The source of direct current is shown as an exciter 13 including a shunt field winding 14. A regulator 17 for controlling the energization of generator field winding 9 has an adjustable resistor 18 which may be connected in series with field winding 9 and the source of direct current but is preferably connected in series with field winding 14 of exciter 13 for varying the energization thereof.

Regulator 17 has a rocking contact sector 19 actuated in any suitable known manner by the shaft 21 of a torque induction motor 20 acting against a suitable spring 12 to increase or decrease the amount of resistor 18 in series with the field winding 14 of exciter 13. Motor 20 is responsive to an operating condition of generator 6 such as the output voltage thereof.

Torque motor 20 is supplied with current from generator 6 through a potential transformer 25, the primary winding of which is connected across a phase of alternating current circuit 8 connected to the output terminals of the generator, and the secondary winding is connected to a circuit 26 supplying current to motor 20. An adjusting rheostat 3 may be included in series with motor 20 and the secondary winding of transformer 25.

The division of current between generator 6 and other generators (not shown) connected to line 8 may be controlled by means of a current transformer 4 connected to a resistor 5 in circuit 26 as is well known.

Torque motor 20 is of the split phase type and comprises a pair of coils 21, 22 connected in parallel circuits. Coil 22 is connected in series with an adjustable resistor 24 for determining the division of current between coils 21, 22. A capacitor 23 is preferably inserted in series with coil 22 to increase the phase angle between the coil currents and to thereby increase the motor torque. Spring 12 opposes the action of motor 20 to cause the motor to reach a position depending upon the magnitudes of the currents in coils 21, 22.

The damping means affecting the action of the regulator may comprise saturable reactor means of any suitable type such as a single saturable reactor with a three legged core, but preferably comprise a pair of saturable reactors 28, 29 with their inductive windings 30, 31 connected in series with each other and with motor coil 21. The saturating windings 32, 33 may be parallel connected, or series connected as shown. The cores of reactors 28, 29 are preferably but not necessarily provided with air gaps.

Biasing means for the reactors comprise a suitable source of direct current, such as a full wave rectifier 34 connected across transformer 25. Biasing current is supplied to the saturating windings 32, 33, through an adjustable resistor 40, and the biasing current is preferably but not necessarily so adjusted that the cores of the reactors are excited to the region of the knee of their magnetization curves. As a result of such biasing, any increase in the current of the saturating windings decreases the inductance of the reactors, and a decrease in the current of the saturating windings increases the inductance of the reactors.

The saturating windings are differentially connected with respect to windings 30, 31 to excite the reactor cores in opposite directions relative to the excitations produced by windings 30, 31. As a result thereof, the magnetizing effects of windings 30 and 32 are cumulative, when the magnetizing effects of windings 31 and 33 are differential, and vice versa, and the fundamental alternating voltages induced in windings 32, 33 by windings 30, 31 cancel each other in the circuit of windings 32, 33.

Means responsive to the rate of change of the voltage of field winding 14 varied by the regulator comprise a transformer 36 having a primary winding 37 connected across the exciter field winding 14 through an adjustable resistor 39. The secondary winding 38 of transformer 36 is connected across the outer terminals of saturating windings 32, 33 of reactors 28, 29, as shown in Fig. 1. The core of transformer 36 is preferably but not necessarily provided with an air gap.

The torque of torque motor 20 varies in response to variations in the value of the output voltage of generator 6 for actuating regulator 17 to vary the energization of exciter 13 in accordance with variations in the generator output voltage. The exciter 13 energizes the field winding 9 of the generator in accordance with the energization of its own field winding 14. Responsive immediately to the rate of change of the voltage across exciter field winding 14, the damping means including transformer 36 and saturable reactors 28, 29, oppose the regulating action of the torque motor before the desired generator output voltage is reached, thus preventing undesirable overshooting of the regulator and improving the regulating action thereof.

Transformer 36 has a relatively low time constant and quickly responds to changing of voltage across the exciter field due to regulator action to induce a voltage on the secondary winding 38. Voltage appearing on secondary winding 38 causes it to supply a current to saturating windings 32, 33 to vary the direct current therein. Transformer 36 is so dimentioned that the constant current component supplied to winding 38 from rectifier 34 does not saturate the core of the transformer and therefore has no effect on the operation of the system.

Resistor 40 assures that voltage induced in winding 38 of transformer 36 will vary the current in saturating windings 32, 33 in spite of the action of rectifier 34 tending to maintain a constant current in windings 32, 33.

Variation of the direct current bias of the reactors varies the reactance of inductive windings 30, 31 to the alternating current flowing through motor coil 21 to modify the amount of current flowing therein in accordance with the rate of change of voltage on exciter field winding 14.

The regulator 17 is balanced for a given value of voltage in circuit 8 when the torque of recall spring 12 equals the torque of motor 20. Recall spring 12 will rotate the sector 19 to decrease the amount of resistor 18 in circuit with field winding 14. Torque motor 20 will rotate the sector to increase the amount of resistor 18 in the field circuit.

When the voltage of circuit 8 has increased above the normal given value, the torque of motor 20 is increased and actuates sector 19 to decrease the voltage of the field winding for decreasing the output voltage of generator 6. The rate of decrease of the field voltage causes damping transformer 36 to supply a current to saturating windings 32, 33 of reactors 28, 29. The winding connections are so effected that the latter current opposes the bias current supplied to windings 32, 33 to increase the inductance of windings 30, 31 for decreasing the torque of the motor 20, thus opposing the action of the regulator.

When the voltage of circuit 8 has decreased below the normal value, the torque of motor 20 is decreased and spring 12 actuates the sector to increase the voltage of the field winding for increasing the output voltage of generator 6. The rate of increase of the field voltage causes damping transformer 36 to supply a current to windings 32, 33 of reactors 28, 29 to aid the bias current supplied thereto to decrease the inductance of windings 30, 31 for increasing the torque of motor 20, thus opposing the action of the regulator.

Instead of being connected to windings 32, 33, winding 38 of damping transformer 36 may be connected across additional windings 41, 42 of saturable reactors 28, 29, as shown in Fig. 2. Windings 41, 42 may be parallel connected, or series connected as windings 32, 33, and with such polarities that their cores are correspondingly excited, to prevent alternating voltages induced in windings 41, 42 from appearing across winding 38 of the damping transformer. The use of windings 41, 42 has the advantage of avoiding loading winding 38 with a useless current component from rectifier 34.

Although but two embodiments of the present invention have been shown and described, it will be apparent to those skilled in the art that various changes and modifications may be made therein without departing from the spirit of the invention or from the scope of the appended claims.

It is claimed and desired to secure by Letters Patent:

1. In a system for maintaining a quantity substantially constant, the combination of a circuit supplied with alternating current of magnitude proportional to said quantity, a direct current circuit for controlling the magnitude of said quantity, a motor for controlling the magnitude of the voltage of said direct current circuit, said motor comprising a pair of cooperating coils connected in two parallel branches of said alternating current circuit, a saturable reactor having an inductive winding connected in series with one of said coils in one of said branches, a saturating winding on said reactor for varying the impedance of said inductive winding and thereby vary the current through said one of said coils to vary the torque of said motor, and means for energizing said saturating winding with a current which is a measure of the rate of change of said voltage comprising a damping transformer having its primary winding connected to said direct current circuit and its secondary winding connected to said saturating winding.

2. In a system for maintaining a quantity substantially constant, the combination of a circuit supplied with alternating current of magnitude proportional to said quantity, a direct current circuit for controlling the magnitude of said quantity, a motor for controlling the magnitude of the voltage of said direct current circuit, said motor comprising a pair of cooperating coils connected in two parallel branches of said alternating current circuit, a saturable reactor having an inductive winding connected in series with one of said coils in one of said branches, a capacitor connected in series with the other said coil in the other said branch, a saturating winding on said reactor for varying the impedance of said inductive winding and thereby vary the current through said one of said coils to vary the torque of said motor, and means for energizing said saturating winding with a current which is a measure of the rate of change of said voltage comprising a damping transformer having its primary winding connected to said direct current circuit and its secondary winding connected to said saturating winding.

3. In a system for maintaining a quantity substantially constant, the combination of a circuit supplied with alternating current of magnitude proportional to said quantity, a direct current circuit for controlling the magnitude of said quantity, a motor for controlling the magnitude of the voltage of said direct current circuit, said motor comprising a pair of cooperating coils connected in two parallel branches of said alternating current circuit, a saturable reactor having an inductive winding connected in series with one of said coils in one of said branches, a saturating winding on said reactor for varying the impedance of said inductive winding and thereby vary the current through said one of said coils to vary the torque of said motor, a source of direct current connected to said saturating winding to supply a bias current thereto, and means for energizing said saturating winding with a current which is a measure of the rate of change of said voltage comprising a damping transformer having its primary winding connected to said direct current circuit and its secondary winding connected to said saturating winding.

4. In a system for maintaining a quantity substantially constant, the combination of a circuit supplied with alternating current of magnitude proportional to said quantity, a direct current circuit for controlling the magnitude of said quantity, a motor for controlling the magnitude of the voltage of said direct current circuit, said motor comprising a pair of cooperating coils connected in two parallel branches of said alternating current circuit, a saturable reactor having an inductive winding connected in series with one of said coils in one of said branches, a saturating winding on said reactor for varying the impedance of said inductive winding and thereby vary the current through said one of said coils to vary the torque of said motor, a bias winding on said reactor, a source of direct current for supplying current to said bias winding, and means for energizing said saturating winding with a current which is a measure of the rate of change of said voltage comprising a damping transformer having its primary winding connected to said direct current circuit and its secondary winding connected to said saturating winding.

DANIEL J. SIKORRA.
DALE V. HOTSON.

REFERENCES CITED

The following references are of record in the file of this patent:

UNITED STATES PATENTS

| Number | Name | Date |
|---|---|---|
| 1,824,714 | Fitzgerald | Sept. 22, 1931 |
| 1,933,858 | Keller | Nov. 7, 1933 |